United States Patent

Williams et al.

(10) Patent No.: US 6,244,837 B1
(45) Date of Patent: Jun. 12, 2001

(54) DEFORMED COMPRESSOR MOTOR WINDING TO ACCOMODATE COMPONENTS

(75) Inventors: John R. Williams; Tracy L. Milliff, both of Bristol, VA (US); Joseph F. Loprete, Bristol, TN (US)

(73) Assignee: Scroll Technologies, Arkadelphia, AR (US)

(*) Notice: Subject to any disclaimer, the term of this patent is extended or adjusted under 35 U.S.C. 154(b) by 0 days.

(21) Appl. No.: 09/415,122

(22) Filed: Oct. 8, 1999

Related U.S. Application Data

(63) Continuation-in-part of application No. 09/320,942, filed on May 27, 1999.

(51) Int. Cl.$^7$ ............................. F04B 35/04; F04B 17/00
(52) U.S. Cl. ..................................... 417/423.7; 417/410.1
(58) Field of Search .................. 417/410.1, 422, 417/423.1, 423.7, 423.15, 423.14, 410.3, 410.5

(56) References Cited

U.S. PATENT DOCUMENTS

| | | | |
|---|---|---|---|
| 3,853,429 | * 12/1974 | Wiedenmann | 417/356 |
| 4,623,304 | * 11/1986 | Chikada et al. | 417/312 |
| 4,815,947 | * 3/1989 | Okoma et al. | 417/410 |
| 5,104,297 | * 4/1992 | Sekiguchi et al. | 417/410 |

* cited by examiner

Primary Examiner—Teresa Walberg
Assistant Examiner—Thor Campbell
(74) Attorney, Agent, or Firm—Carlson, Gaskey & Olds

(57) ABSTRACT

A method of reducing the height of a sealed compressor incorporates the use of a non-cylindrical portion of the stator windings on the compressor motor. A non-cylindrical portion provides a space between the sealed housing and the windings that can accommodate an additional component. In one embodiment, the additional component is the electrical connection, and in another embodiment, the additional component is an oil heater. Typically, these components were mounted axially beyond the extent of the motor stator, and thus required additional space. The present invention thus allows a smaller height compressor profile.

13 Claims, 4 Drawing Sheets

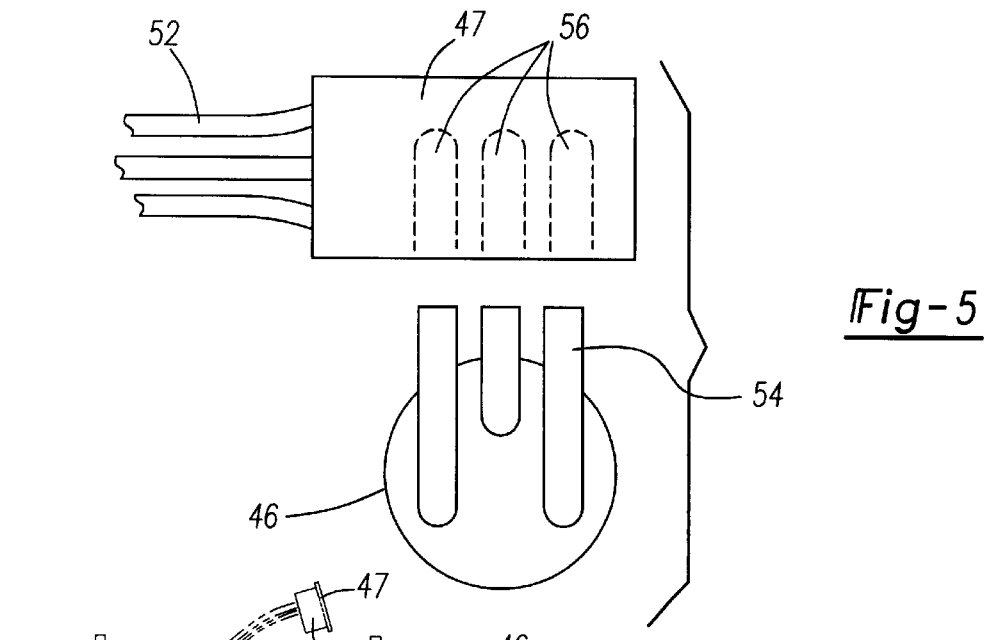
_Fig-5_
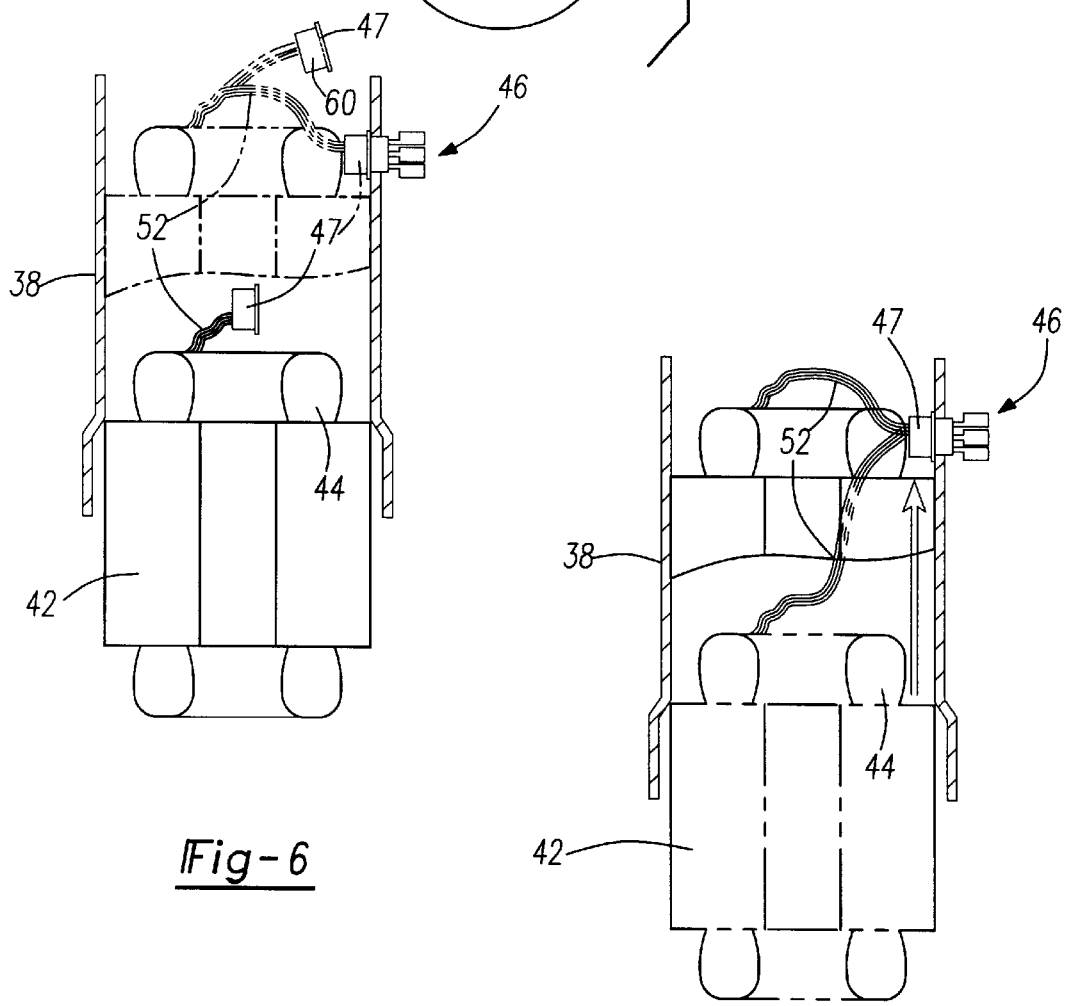
_Fig-6_
_Fig-7_

DEFORMED COMPRESSOR MOTOR WINDING TO ACCOMODATE COMPONENTS

This application is a continuation in part of Ser. No. 09/320,942, filed May 27, 1999.

BACKGROUND OF THE INVENTION

This invention relates to placing components such as power terminal connections or a heater in a sealed compressor preferably to reduce the length of the compressor unit.

Modern compressors often include a compressor pump unit mounted within a sealed housing structure. The sealed housing structure receives the compressor pump unit and an electric motor for driving the compressor pump unit. A crankcase supports the pump unit.

Refrigerant and oil are allowed to flow within the compressor housing to perform various functions such as cooling the motor, etc. Various structure assists in moving the oil throughout the compressor housing.

The electric motor includes a stator mounted in a lower portion of the housing below the crankcase. There is typically a "dead" space between the stator and the crankcase. This space is used for allowing connection of an electrical connection through the sealed housing and to the motor. The overall height of the scroll compressor is defined by the necessary components, such as the motor, crankcase, and other components, as well as the "dead" space between the stator and the crankcase.

Another area of a sealed compressor which may sometimes not be used as efficiently as desired is near the lower end of the compressor shell. There are stator windings at both ends, and typically there is space left beneath the stator windings for the inclusion of components such as an oil heater. Again, this dead space undesirably increases the overall length of the sealed compressor.

Prior art motors have had a small deformed portion at the winding area where a motor protector has been packaged. However, the protector is essentially a part of the motor. Other components of the compressor have typically not been packaged in the length of the motor.

It is, thus, desirable to eliminate "dead" space and reduce the overall height of the scroll compressor. In some applications, there may be other areas that would be useful for packaging the electrical connection.

SUMMARY OF THE INVENTION

The present invention reduces the height of a sealed compressor. Preferably, the invention provides components other than a motor component at the stator winding level and a method for carrying out same so as to eliminate unnecessary space within the compressor housing. Within this application the term "component" extends to associated electrical elements such as the electrical connection, a crankcase heater, or other components that are not part of the motor itself.

In one embodiment, a terminal connection is made within the stator winding height of a compressor. The compressor includes a compressor pump unit, a motor for driving the compressor pump unit, and a housing surrounding the compressor pump unit and the motor. The motor includes a stator having stator windings and a rotor wherein the stator extends along an axis for a fixed axial length and the rotor rotates about the axis. A set of terminal pins extends through the housing for providing electrical connection of the motor. The terminal pins are mounted on the inside of the housing within an axial length of the stator to reduce the height of the scroll compressor.

To aid in packaging the connection within the stator winding level, the stator winding itself may be deformed inwardly toward the axis of rotation to allow connection of the connector and terminal pins.

For purposes of this application, the electrical connection is defined as a "component". The stator may be blanked by any manufacturing technique, and the method for deforming the stator inwardly, or alternatively, originally forming it with the desired shape, forms no portion of this invention, and is within the skill of the worker in this art.

In a second embodiment, the component may be an element such as an oil heater positioned near a lower end of the sealed housing. The lower windings are deformed or manufactured to have a non-cylindrical shape at one circumferential location to provide space to accommodate this component. As with the other embodiment, this decreases the required overall height of the compressor.

In a most preferred embodiment, the compressor pump unit is a scroll compressor.

These and other objects, features and advantages of the present invention can be best understood from the following specification and drawings, the following of which is a brief description.

BRIEF DESCRIPTION OF THE DRAWINGS

FIG. 5 is a perspective view of the terminal pins and mating connector according to a second connector configuration;

FIG. 6 is a cross-sectional view of the stator in the compressor housing illustrating the method for connecting the terminal pins to the motor; and FIG. 7 is a cross-sectional view of the stator in the compressor housing illustrating a second method for connecting the terminal pins to the motor.

DETAILED DESCRIPTION OF THE PREFERRED EMBODIMENT

Figure 1:
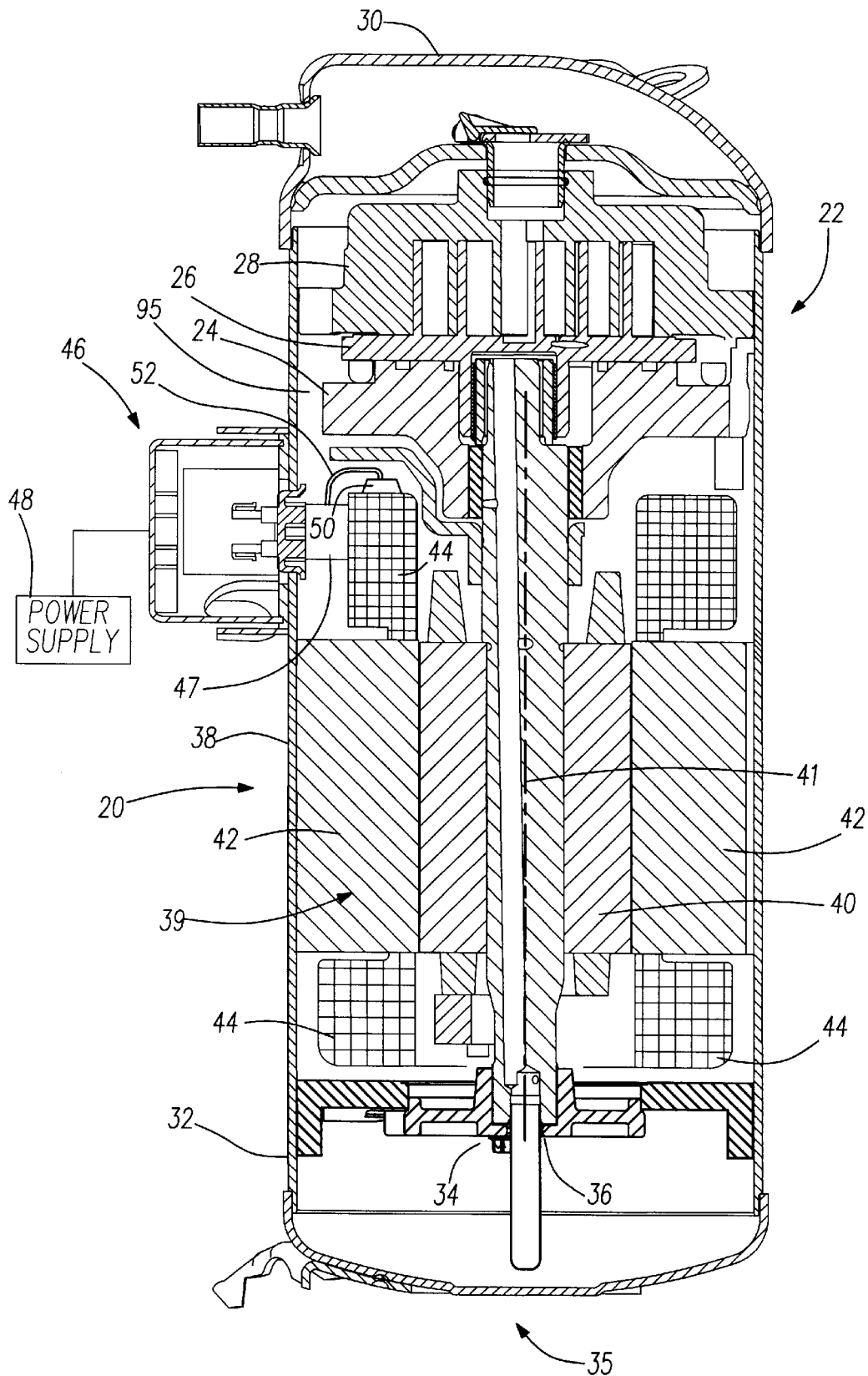
FIG. 1 is a cross-sectional view of the inventive connector incorporated in the compressor housing.

FIG. 1 is a cross-sectional view of a compressor incorporating the inventive connector. Compressor 20 is a scroll compressor and receives a pump unit 22 including a crankcase 24, an orbiting scroll 26, and a non-orbiting, or fixed scroll 28. An end cap 30 encloses the top end of the compressor 20. While a scroll compressor is illustrated, other compressor types can be used with the invention.

A lower bearing mount 32 receives a lower bearing 34. A lower end cap 35 closes the lower end of the compressor.

The bearing 34 mounts a shaft 36. Between the end caps 30 and 35 a generally cylindrical housing 38 receives and encloses all components 24, 26, 28, 30, 32, 34, 36 and a motor 39, as shown in FIG. 1. The motor 39 includes a rotor 40 that rotates about an axis 41 and a stator 42 having stator windings 44.

In the prior art, space has been provided axially between the motor 39 and crankcase 24 to allow electrical connection to be made to the motor 39. In the present invention, however, the space is eliminated by having the electrical connection 46, including connector 47, located between the stator winding 44 and the inside wall of the housing 38. Electrical connection 46 is coupled to power supply 48, which supplies power to the motor 39. An appropriate motor protector 50 is also included in compressor 20 coupled to motor 39 and having wires 52 that extend from electrical connection 46 to motor protector 50.

Figure 2:
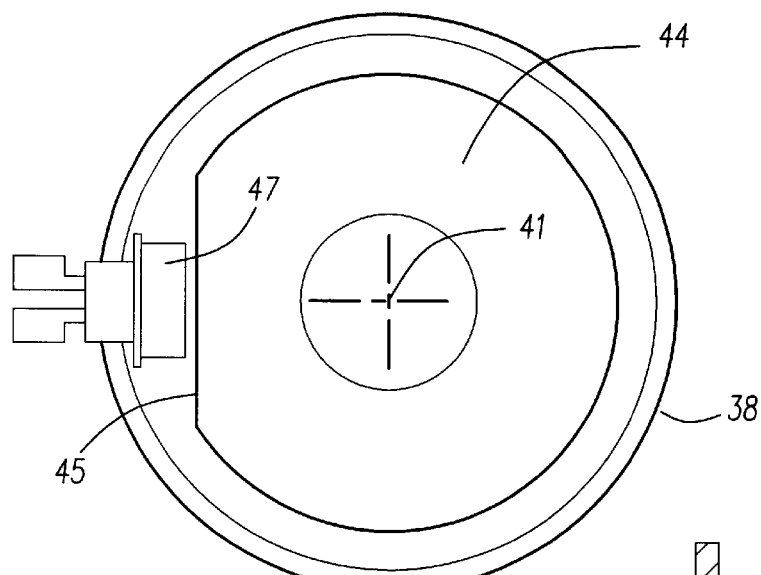
FIG. 2 is a top view of the stator according to a first embodiment of the present invention.

As shown in FIG. 2, the stator windings 44 may be deformed as shown at 45 in order to accommodate connector 47 of electrical connection 46. In this case the windings 44 are deformed inwardly toward the axis 41. The deformation 45 can be done by deforming the windings when they are formed. The deformation can be by processes known as blanking, coining or other methods. The electrical component, here connector 47, is incorporated into the space 45. Essentially, space 45 is a non-cylindrical portion of the otherwise mostly cylindrical windings.

Figure 3:
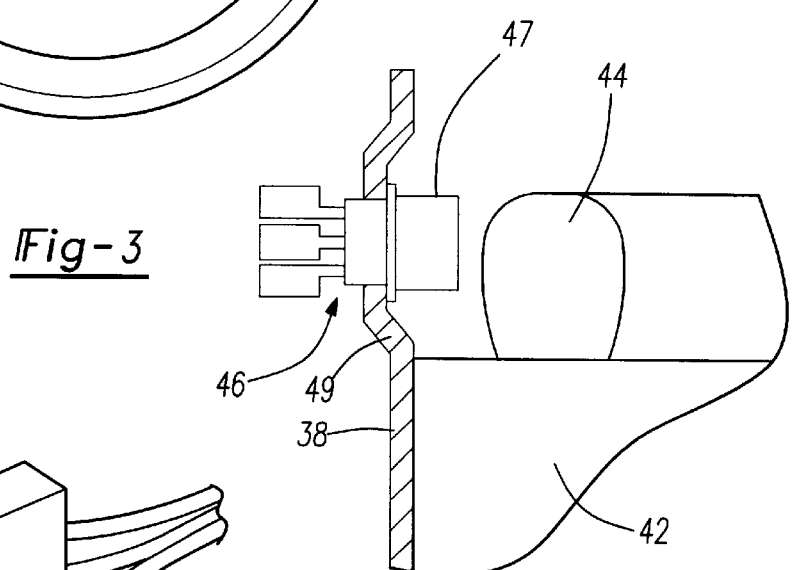
FIG. 3 is a cross-sectional view of the compressor housing according to a second embodiment of the present invention.

Alternatively, or in combination, the cylindrical housing 38 may be deformed outwardly as shown at 49, and away from the axis 41 to accommodate the connector 47, as shown in FIG. 3.

Typically, electrical connections have been made by sliding a connector onto the terminal pins in a direction generally perpendicular to the rotational axis. The prior art required the dead space.

Figure 4:
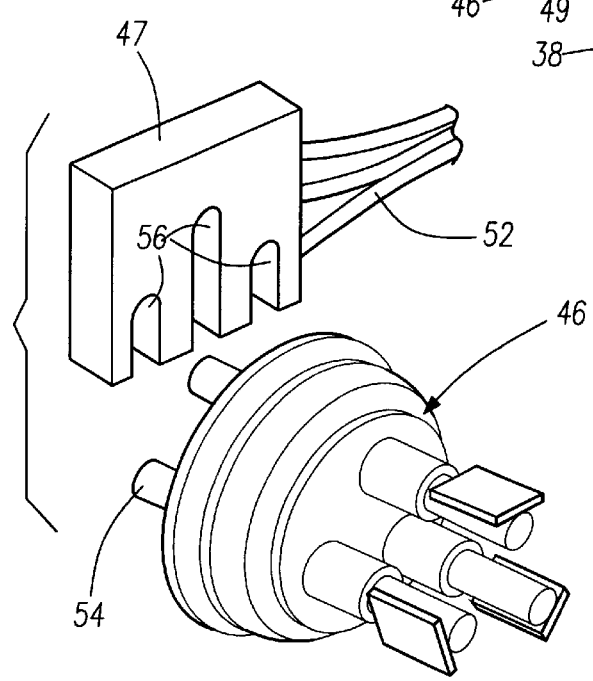
FIG. 4 is a perspective view of the terminal pins and mating connector according to a first connector configuration.

Alternative connection configurations are shown in FIGS. 4 and 5 to accommodate placement of connector 47 between stator windings 44 and cylindrical housing 38. In FIG. 4, terminal pins 54 of electrical connection 46 extend generally perpendicular to the axis 41 of rotation. Connector 47 has cooperating slots 56 for receiving each of the pins 54 when slid onto the pins 54 downwardly in a direction generally parallel to the axis 41 of rotation.

In FIG. 5, terminal pins 54 are bent upward at a 90 degree angle so that they are parallel to axis 41. The cooperating slots 56 are, thus, positioned so that they can be slid onto pins 54 in the downward motion.

FIG. 6 illustrates the physical connection of connector 47 to electrical connection 46. The stator 42 is initially pressed or heat shrunk into housing 38. The connector 47 is connected to stator 42 by wires 52, but is unconnected to electrical connection 46, as shown in phantom at 60.

Connector 47 can then be slid onto the pins 54 of electrical connection 46 in a direction generally parallel to the axis of rotation.

The present invention, however, also allows the connector 47 to be slid onto the pins 54 first followed by placement of the stator 42, as shown in FIG. 7. With this embodiment, the prior art type connectors which slide in a direction perpendicular to the axis could also be used. Most preferably, the stator will be initially partially inserted, and the connection then made. The stator will then be fully inserted and secured.

Figure 8:
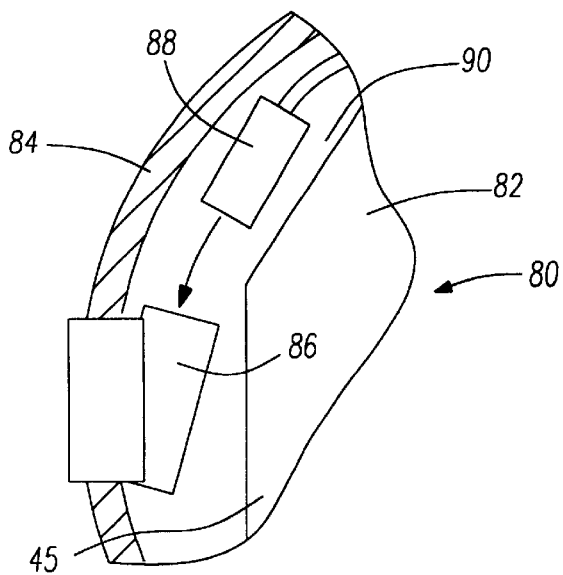
FIG. 8 shows an alternative embodiment.

As shown in FIG. 8, another embodiment 80 incorporates a stator winding 82 positioned to be spaced from the shell 84. The connector 86 is positioned to receive the electrical connection 88 in a generally tangential direction relative to the shell 84. Thus, a space 90 allowing the tangential movement is added to one extreme of the space 45.

In sum, the terminal pin connections are positioned in a location such that they reduce the required space. In several embodiments the electrical connection is made by connecting the pins with a connector which moves in a direction that does not include a substantial radial component. Preferably the direction is parallel to the axis of rotation, tangential to the shell, or a combination of the two. Further, while the connection is shown within the axial length of the stator, other components may receive the connector. As an example, the inventive connector insertion facilitates positioning upwardly in the axial length of the crankcase, such as for example in the area generally indicated by 95 in FIG. 1.

Figure 9:
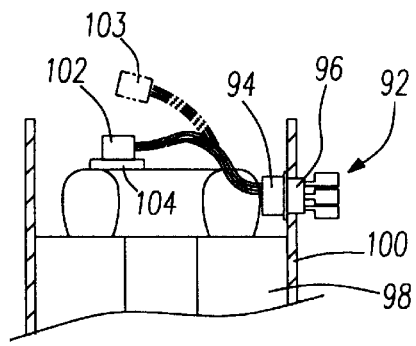
FIG. 9 shows an alternative embodiment.

FIG. 9 shows another embodiment 92, where the connection to the motor is made after the connector 94 has been attached to the terminal pins 96 and after the stator 98 has been attached to the housing 100. In one embodiment, a pigtail connector 102 is utilized which is connected to the terminal pins 96. Once that connection is made and motor stator 98 has been connected to the housing, the pigtail connection 102 is then connected to the motor 98 at 104. The pigtail connector 102 is shown in phantom at 103 unconnected to the motor, and in solid line connected to the motor. Again, the exact structure of the connector is within the skill of a worker in this art. It is the concept of such a connection which is inventive here.

Figure 10:
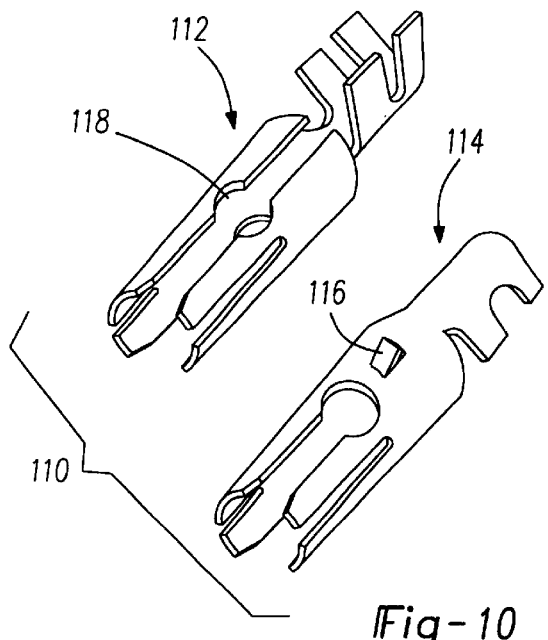
FIG. 10 shows a terminal pin embodiment.

FIG. 10 shows an embodiment 110 of the electrical connection wherein the connector and terminal pins 112 and 114 include a locking structure. In one example, a bump 116 is formed that will snap into an opening 118 in the opposed connector. This will prevent inadvertent movement of the pins relative to each other.

Figure 11:
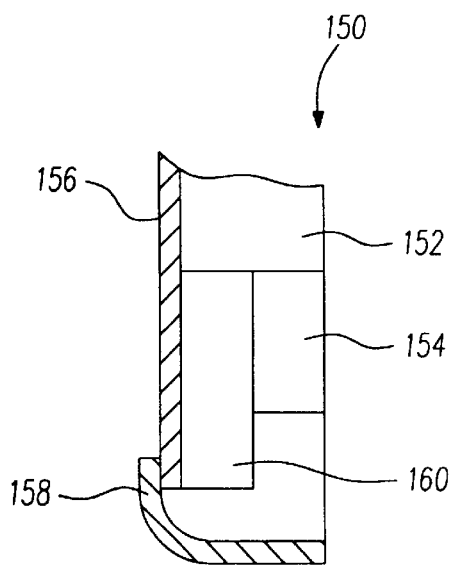
FIG. 11 shows another embodiment of the present invention.

FIG. 11 shows another component which can be incorporated into a non-cylindrical portion of the stator windings. A cross-section of FIG. 11 would look similar to that shown in FIG. 2. In the FIG. 11 embodiment 150, motor stator 152 incorporates windings 154 which have the non-cylindrical portion. A center housing shell 156 is attached to a bottom shell 158, shown somewhat schematically. An oil heater, otherwise known as a crankcase heater 160, is incorporated into the space provided by the non-cylindrical portion of the windings 154. Again, a cross-section of the windings 154 would look similar to that shown in FIG. 2. Providing the non-cylindrical portion at one circumferential location provides a space for incorporation of the electric component, here oil heater 160, similar to the way space is provided for the electric component connection in the FIG. 2 embodiment.

Although a preferred embodiment has been disclosed, a worker of ordinary skill in the art would recognize that certain modifications come within the scope of the invention. For that reason, the following claims should be studied to determine the true scope and content of this invention.

What is claimed is:

1. A method of forming a sealed compressor comprising the steps of:

(1) providing a compressor pump unit, and an electric motor for driving said compressor pump unit, said motor including a stator and a rotor, said stator having windings, and supplying at least one additional component, and a sealed housing for securing said compressor pump unit, said motor, and said additional component;

(2) forming said windings to have a non-cylindrical portion at least one circumferential location; and (3) mounting said compressor pump unit and said motor in said sealed housing, with said additional component being received in a space associated with said non-cylindrical portion of said stator winding.

2. A method as recited in claim 1, wherein said additional component is an electrical connection to supply power to said motor.

3. A method as recited in claim 1, wherein said electrical connection is completed prior to said motor being secured in said housing, said motor being initially inserted said housing before said electrical connection is completed.

4. A method as recited in claim 1, wherein said additional component is a heater for heating oil in said sealed housing.

5. A method as recited in claim 1, wherein said compressor pump unit is a scroll compressor.

6. A method as recited in claim 1, wherein said non-cylindrical portion is formed by deforming said windings when said windings are being formed.

7. A sealed compressor comprising:

a sealed housing defining a first end and a second end;

a compressor pump unit received within said sealed housing adjacent said first end;

an electric motor operable to drive said compressor pump unit, and spaced toward said second end from said compressor pump unit, said electric motor having a motor stator positioned adjacent to said housing, and a motor rotor within said stator, said stator having stator windings adjacent each of two axial ends; and said stator windings being generally cylindrical, with said stator windings adjacent at least one of said ends having a non-cylindrical portion at least at one circumferential location;

said stator windings extending for a distance along a rotational axis of said motor; and an additional component mounted within a space defined between said housing and said non-cylindrical portion, said additional component being received at least partially within an axial length of said stator windings.

8. A compressor as recited in claim 7, wherein said compressor pump unit is a scroll compressor unit.

9. A compressor as recited in claim 8, wherein said non-cylindrical portion is formed by shaping said windings when said windings are formed.

10. A compressor as recited in claim 8, wherein said additional component is an electrical connection to supply power to said motor.

11. A compressor as recited in claim 7, wherein said additional component is an oil heater.

12. A method of forming a sealed compressor comprising the steps of:

(1) providing a compressor pump unit, and an electric motor for driving said compressor pump unit, said motor including a stator and a rotor, said stator having windings, and supplying at least one additional component, and a sealed housing for securing said compressor pump unit, said motor, and said additional component;

(2) forming said stator to have an axial length and an upper end spaced toward the location of said compressor pump unit, and at one circumferential location;

(3) initially inserting a motor stator into said sealed housing;

(4) completing an electrical connection between said motor, and a power supply to said motor; and (5) securing said motor stator in said housing, said electrical connection being received in a space associated with said axial upper end, such that said electrical connection is spaced within said axial length of said stator.

13. A method as set forth in claim 12, wherein said motor stator is formed to have a non-cylindrical portion at an upper end, and said electrical connection being received in a space provided by said non-cylindrical portion.

\* \* \* \* \*